United States Patent
Becker et al.

(10) Patent No.: US 12,510,901 B2
(45) Date of Patent: Dec. 30, 2025

(54) UNMANNED VEHICLE AND METHOD FOR A FIRST UNMANNED VEHICLE FOR AVOIDING A CONFLICT WITH A SECOND UNMANNED VEHICLE

(71) Applicant: Sony Group Corporation, Tokyo (JP)

(72) Inventors: Florian Becker, Stuttgart (DE); Bi Wang, Stuttgart (DE)

(73) Assignee: Sony Group Corporation, Tokyo (JP)

(*) Notice: Subject to any disclaimer, the term of this patent is extended or adjusted under 35 U.S.C. 154(b) by 168 days.

(21) Appl. No.: 17/916,040

(22) PCT Filed: Mar. 25, 2021

(86) PCT No.: PCT/EP2021/057848
§ 371 (c)(1),
(2) Date: Sep. 30, 2022

(87) PCT Pub. No.: WO2021/198043
PCT Pub. Date: Oct. 7, 2021

(65) Prior Publication Data
US 2023/0168695 A1    Jun. 1, 2023

(30) Foreign Application Priority Data

Apr. 1, 2020    (EP) .................................... 20167461

(51) Int. Cl.
*G05D 1/00* (2024.01)
*B64U 20/80* (2023.01)
(Continued)

(52) U.S. Cl.
CPC ........... *G05D 1/1064* (2019.05); *B64U 20/80* (2023.01); *G08G 5/21* (2025.01); *G08G 5/25* (2025.01);
(Continued)

(58) Field of Classification Search
CPC ..................................................... G05D 1/1064
See application file for complete search history.

(56) References Cited

U.S. PATENT DOCUMENTS 10,860,115 B1 *  12/2020  Tran ....................... G06F 3/0346
11,531,557 B2 *  12/2022  Woodward ............. G06N 20/00
(Continued)

FOREIGN PATENT DOCUMENTS

CN          109901616 A       6/2019
EP          3428765 A1 *      1/2019   ........... B64C 39/024
(Continued)

OTHER PUBLICATIONS

Machine Translation of WO2019141221A1 (2018).*
(Continued)

*Primary Examiner* — Jean Paul Cass
(74) *Attorney, Agent, or Firm* — XSENSUS LLP

(57) ABSTRACT

A decentralized method for a first Unmanned Vehicle, UV, for avoiding a conflict with a second UV is provided. The method includes determining, based on a current movement plan of the first UV and a current movement plan of the second UV received from the second UV, whether a conflict with the second UV is likely to occur. If it is determined that a conflict with the second UV is likely to occur, the method further includes performing at least one iteration of the following steps: a) determining a candidate movement plan of the first UV and receiving, from the second UV, a candidate movement plan of the second UV; b) determining first cost values for different combinations of one of the current movement plan and the candidate movement plan of the first UV with one of the current movement plan and the candidate movement plan of the second UV using a first cost function; c) receiving, from the second UV, second cost values for the different combinations, wherein the second cost values are calculated by the second UV using a second (Continued)

cost function; d) combining the first cost values and the second cost values in order to determine third cost values for the different combinations; and e) updating the current movement plan of the first UV to the movement plan of the first UV that is included in the combination exhibiting the best third cost value among the different combinations.

18 Claims, 9 Drawing Sheets

(51) Int. Cl.
*G08G 5/21* (2025.01)
*G08G 5/25* (2025.01)
*G08G 5/55* (2025.01)
*G08G 5/57* (2025.01)
*G08G 5/80* (2025.01)

(52) U.S. Cl.
CPC ............... *G08G 5/55* (2025.01); *G08G 5/57* (2025.01); *G08G 5/80* (2025.01)

(56) References Cited

U.S. PATENT DOCUMENTS

| | | | | |
|---|---|---|---|---|
| 11,623,346 B2* | 4/2023 | Colasanto | ............ | G06N 3/126 |
| | | | | 700/245 |
| 11,634,126 B2* | 4/2023 | Floyd-Jones | ......... | B60W 30/09 |
| | | | | 701/301 |
| 11,673,265 B2* | 6/2023 | Ames | ................ | B25J 9/1651 |
| | | | | 700/262 |
| 11,694,556 B2* | 7/2023 | Chen | .................. | G08G 5/54 |
| | | | | 701/122 |
| 11,738,457 B2* | 8/2023 | Sorin | .................. | B25J 15/04 |
| | | | | 700/259 |
| 11,745,346 B2* | 9/2023 | Sorin | ............... | G05D 1/0214 |
| | | | | 700/255 |
| 11,970,161 B2* | 4/2024 | Sorin | ............... | B60W 60/0023 |
| 11,978,348 B2* | 5/2024 | Shay | .................. | G08G 5/53 |
| 12,005,585 B2* | 6/2024 | Schönherr | ............ | B25J 9/1666 |
| 2007/0222665 A1 | 9/2007 | Koeneman | | |
| 2012/0143505 A1* | 6/2012 | Giovannini | .............. | G08G 5/76 |
| | | | | 701/540 |
| 2019/0145778 A1* | 5/2019 | Huang | ................ | G05D 1/101 |
| | | | | 701/3 |
| 2019/0391597 A1* | 12/2019 | Dupuis | ................ | B25J 9/0084 |
| 2020/0016754 A1 | 1/2020 | Skubch | | |
| 2021/0089055 A1* | 3/2021 | Tran | ...................... | G08G 5/55 |
| 2021/0253128 A1* | 8/2021 | Nister | ................... | G05D 1/646 |
| 2022/0414460 A1* | 12/2022 | Soleyman | ........... | G06N 3/0455 |
| 2023/0367336 A1* | 11/2023 | Vinod | ................ | G05D 1/0088 |

FOREIGN PATENT DOCUMENTS

| | | | | |
|---|---|---|---|---|
| FR | 2968441 A1 * | 6/2012 | ........... | G08G 5/0039 |
| WO | WO-2018190833 A1 * | 10/2018 | ........... | B64C 39/024 |
| WO | WO-2019141221 A1 | 7/2019 | | |
| WO | WO-2021198043 A1 * | 10/2021 | ............ | B64U 20/80 |

OTHER PUBLICATIONS

International Search Report and Written Opinion mailed on May 7, 2021, received for PCT Application PCT/EP2021/057848, filed on Mar. 25, 2021, 10 pages.

* cited by examiner

UNMANNED VEHICLE AND METHOD FOR A FIRST UNMANNED VEHICLE FOR AVOIDING A CONFLICT WITH A SECOND UNMANNED VEHICLE

CROSS-REFERENCE TO RELATED APPLICATIONS

The present application is based on PCT filing PCT/EP2021/057848, filed Mar. 25, 2021, which claims priority to EP 20167461.1, filed Apr. 1, 2020, the entire contents of each are incorporated herein by reference.

FIELD

The present disclosure relates to decentralized movement planning for an Unmanned Vehicle (UV). In particular, examples relate to an UV and a method for a first UV for avoiding a conflict with a second UV.

BACKGROUND

UVs such as Unmanned Aerial Vehicles (UAV) navigating in the same air space need at least a basic technique for avoiding collisions in order to avoid loss of vehicle and cargo. In particular, it is desirable to avoid critical situations already in an early phase, not when the critical situation is imminent.

In centralized flight planning, an Unmanned Traffic Management (UTM) server is communicatively coupled to the UAVs and controls the flight plans of the UAVs. However, if an UAV is not able to communicate with the UTM server (e.g. because of a failure at the UTM or the server), the UTM server cannot resolve critical situations with another UAV. Even in a situation in which an UAV is able to communicate with the UTM server, waiting for the UTM's answer is likely not be the best solution if the UAV is already very close to another UAV.

Hence, there may be a demand for improved UV coordination in order to avoid a collision.

SUMMARY

This demand is met by apparatuses and methods in accordance with the independent claims. Advantageous embodiments are addressed by the dependent claims.

According to a first aspect, the present disclosure provides a method for a first UV for avoiding a conflict with a second UV. The method includes determining, based on a current movement plan of the first UV and a current movement plan of the second UV received from the second UV, whether a conflict with the second UV is likely to occur. If it is determined that a conflict with the second UV is likely to occur, the method further includes performing at least one iteration of the following steps: a) determining a candidate movement plan of the first UV and receiving, from the second UV, a candidate movement plan of the second UV; b) determining first cost values for different combinations of one of the current movement plan and the candidate movement plan of the first UV with one of the current movement plan and the candidate movement plan of the second UV using a first cost function; c) receiving, from the second UV, second cost values for the different combinations, wherein the second cost values are calculated by the second UV using a second cost function; d) combining the first cost values and the second cost values in order to determine third cost values for the different combinations; and e) updating the current movement plan of the first UV to the movement plan of the first UV that is included in the combination exhibiting the best third cost value among the different combinations.

According to a second aspect, the present disclosure provides an UV capable of avoiding a conflict with another UV. The UV comprises a propulsion system and circuitry configured to determine, based on a current movement plan of the UV and a current movement plan of the other UV received from the other UV, whether a conflict with the other UV is likely to occur. If it is determined that a conflict with the other UV is likely to occur, the circuitry is further configured to perform at least one iteration of the following steps: a) determine a candidate movement plan of the UV and receive, from the other UV, a candidate movement plan of the other UV; b) determine first cost values for different combinations of one of the current movement plan and the candidate movement plan of the UV with one of the current movement plan and the candidate movement plan of the other UV using a first cost function; c) receive, from the other UV, second cost values for the different combinations, wherein the second cost values are calculated by the other UV using a second cost function; d) combine the first cost values and the second cost values in order to determine third cost values for the different combinations; and e) update the current movement plan of the UV to the movement plan of the UV that is included in the combination exhibiting the best third cost value among the different combinations.

Aspects of the present disclosure may enable decentralized movement planning for UVs in order to enable conflict resolution by direct communication between the involved UVs and without the need for an UTM server.

BRIEF DESCRIPTION OF THE FIGURES

Some examples of apparatuses and/or methods will be described in the following by way of example only, and with reference to the accompanying figures, in which.

DETAILED DESCRIPTION

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a", "an" and "the" is used and using only a single element is neither explicitly nor implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
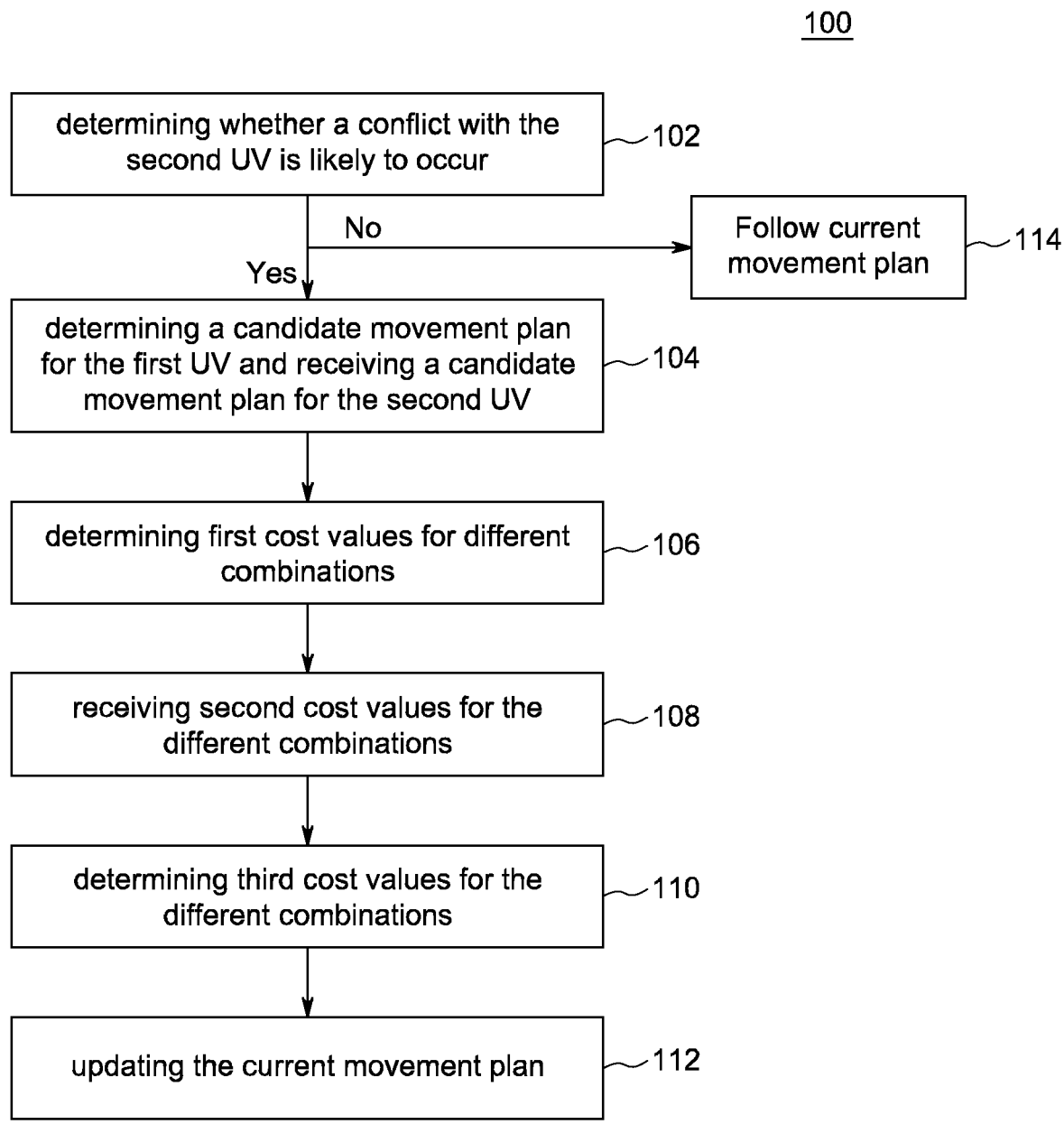
FIG. 1 illustrates a flowchart of an example of a method for a first UV for avoiding a conflict with a second UV.

FIG. 1 illustrates a flowchart of a method 100 for a first UV for avoiding a conflict with a second UV. The first UV and the second UV may be any type of vehicles. For example, the first UV and the second UV may be UAVs (e.g. drones), Unmanned Ground Vehicles (UGV; e.g. autonomous automobiles) or Unmanned Surface Vehicles (USV; e.g. autonomous boats or ships). A conflict is a critical situation between the first UV and the second UV such as a collision or a passing with little distance between the UVs. A conflict between the UVs may cause loss or damage of the UV(s) and/or cargo transported by the UVs. In order to avoid such critical situations already in an early phase (i.e. before the critical situation is imminent), method 100 may be used.

Method 100 comprises determining 102, based on a current movement plan of the first UV and a current movement plan of the second UV received from the second UV, whether a conflict of the first UV with the second UV is likely to occur. The current movement plan of the first UV comprises information about a temporal course of a spatial region reserved for movement of the first UV. Similarly, the current movement plan of the second UV comprises information about a temporal course of a spatial region reserved for movement of the second UV. In other words, a movement plan for a UV describes the temporal-spatial region, which is exclusively reserved for the UV while it navigates in a zone (region, area). For example, the movement plan may comprise a 3D (three-dimensional) or 2D (two-dimensional) position over time (i.e. a trajectory) and optionally the shape and size of a reserved surrounding space for the respective UV. The surrounding space may, e.g., cover the UV extent and optionally a cargo extent and further optional safety margins in order to compensate external influences (e.g. wind), navigation uncertainties of the UV and/or sensor uncertainties of the UV (e.g. position sensor uncertainties).

Determining (calculating) 102 whether a conflict of the first UV with the second UV is likely to occur may, e.g., comprise determining whether a collision of the first UV with the second UV or a passing with little distance between the first UV and the second UV is likely. Since the movement plans of the first UV and the second UV each comprises information about the temporal course of the spatial region reserved for movement of the respective UV, the conflicting situations between the first UV and the second UV may be determined with high accuracy.

If it is determined that a conflict with the second UV is not likely to occur, the method 100 comprises continuing 114 to control movement of the first UV based on the initial current movement plan of the first UV. For example, it may be determined that a conflict with the second UV is not likely to occur if the likelihood for a conflict with the second UV is below a predetermined threshold level, if trajectories of the first UV and the second UV do not indicate a collision of the UVs or if trajectories of the first UV and the second UV indicate a passing of the UVs with at least a predefined distance. In other words, the first UV continues navigation (travel) based on the initial current movement plan of the first UV if no conflict with the second UV is expected.

If it is determined that a conflict with the second UV is likely to occur, the method 100 comprises performing at least one iteration of the steps 104 to 112 described in the following for adapting the movement plan in order to avoid the conflict with the second UV.

The method 100 comprises determining 104 a candidate movement plan of the first UV and receiving, from the second UV, a candidate movement plan of the second UV. The candidate movement plan of the first UV and the candidate movement plan of the second UV are updated movement plans for avoiding the conflict between the first UV and the second UV. For example, the candidate movement plan of the first UV may be determined based on the current movement plant of the first UV or one or more candidate movement plans determined in previous iterations of the steps 104 to 112.

Further, the method 100 comprises determining 106 first cost values for different combinations of one of the current movement plan and the candidate movement plan of the first UV with one of the current movement plan and the candidate movement plan of the second UV using a first cost function. For example a first cost value may be determined for the combination of the current movement plan of the first UV with the candidate movement plan of the second UV, the combination of the candidate movement plan of the first UV with the current movement plan of the second UV, the combination of the candidate movement plan of the first UV with the candidate movement plan of the second UV, the combination of the current movement plan of the first UV with the current movement plan of the second UV.

The first cost function is a function that predicts the costs for the first UV when following one of the current movement plan and the candidate movement plan of the first UV and further takes into account the potential movement plans of the second UV.

The first cost function may comprise various terms for taking into account different costs that may arise from the movement plans. For example, the first cost function may comprise at least one term for costs related to an energy consumption of the first UV, at least one term for costs related to a late arrival of the first UV at a destination, at least one term for costs related to a risk of loss of the first UV, at least one term for costs related to a risk of loss of a cargo transported by the first UV and/or at least one term related to a priority of a trip of the first UV. In other examples, the first cost function may comprise less, more or different terms.

For determining the first cost values, the first cost function takes into account one or more properties of the first UV such as, e.g., a remaining energy available at the first UV, a weight of the first UV and/or a cargo transported by the first UV, a destination of the first UV, capabilities of the first UV, or a current configuration of the first UV. In other words, the first cost function is for determining the costs for the different combinations of the movement plans from the first UV's point of view.

The method 100 additionally comprises receiving 108, from the second UV, second cost values for the different combinations. The second cost values are calculated by the second UV using a second cost function. The second cost function takes into account properties of the second UV similar to what is described above for the first cost function. In other words, the second cost function is for determining the costs for the different combinations of the movement plans from the second UV's point of view.

Further, the method 100 comprises combining the first cost values and the second cost values in order to determine third cost values for the different combinations. Since the first cost values are determined based on the first UV's point of view and since the second cost values are determined based on the second UV's point of view, combining them to the third cost values may allow to assess (evaluate) the different combinations of the movement plans in a fair manner as the points of view of both UVs are taken into account. In other words, priorities, aims, capabilities, etc. of both involved UVs may be taken into account. For example, the first cost values and the second cost values may be added and optionally be weighted before addition.

The method 100 comprises updating 112 the current movement plan of the first UV to the movement plan of the first UV that is included in the combination exhibiting the best third cost value among the different combinations. That is, the current movement plan of the first UV is updated to the one of the current movement plan of the first UV and the candidate movement plan of the first UV that is included in the combination exhibiting the best third cost value. In other words, the current movement plan of the first UV remains as it is if the current movement plan of the first UV is included in the combination exhibiting the best third cost value among the different combinations, or the current movement plan of the first UV is exchanged with the candidate movement plan if the candidate movement plan of the first UV is included in the combination exhibiting the best third cost value among the different combinations. Accordingly, the first UV may avoid the conflict with the second UV and continue movement (travel) using the movement plan causing the lowest costs.

The method 100 may allow to avoid conflicts (e.g. collisions or critical situations) between the first UV and the second UV. Further, method 100 may allow conflict avoidance well ahead in time, i.e. before critical situations occur. Method 100 may allow to resolve a potential conflict between the first UV and the second UV by taking into account priorities, aims, capabilities, etc. of both involved UVs. Further, method 100 may allow to resolve a potential conflict between the first UV and the second UV in a decentralized manner, i.e. only the affected UVs are involved, but no additional ground station is required.

In order to minimize the overall costs, the method 100 may optionally further comprise determining whether the third cost value of the combination exhibiting the best third cost value in the recent (latest) iteration of the steps 104 to 112 satisfies a predetermined quality criterion. In other words, it is determined whether the costs for the combination of movement plans selected in step 112 of the latest iteration are already low enough. If the third cost value of the combination exhibiting the best third cost value in the recent iteration does not satisfy the predetermined quality criterion, the method 100 comprises performing another iteration of the above described steps 104 to 112. On the other hand, if the third cost value of the combination exhibiting the best third cost value in the recent iteration does satisfy the first predetermined quality criterion, the method 100 comprises controlling movement of the first UV based on the updated current movement plan determined in the recent iteration. Accordingly, the total costs for resolving the potential conflict between the first UV and the second UV may be iteratively reduced until the costs are low enough. Accordingly, movement plans with high costs may be rejected.

The second UV may perform steps equivalent to the steps 102 to 114 described above. In order to provide the second UV with the required information, the method 100 may optionally comprise one or more of transmitting the current movement plan of the first UV to the second UV, transmitting the candidate movement plan of the first UV to the second UV, and transmitting the first cost values for the different combinations to the second UV.

Figure 2:
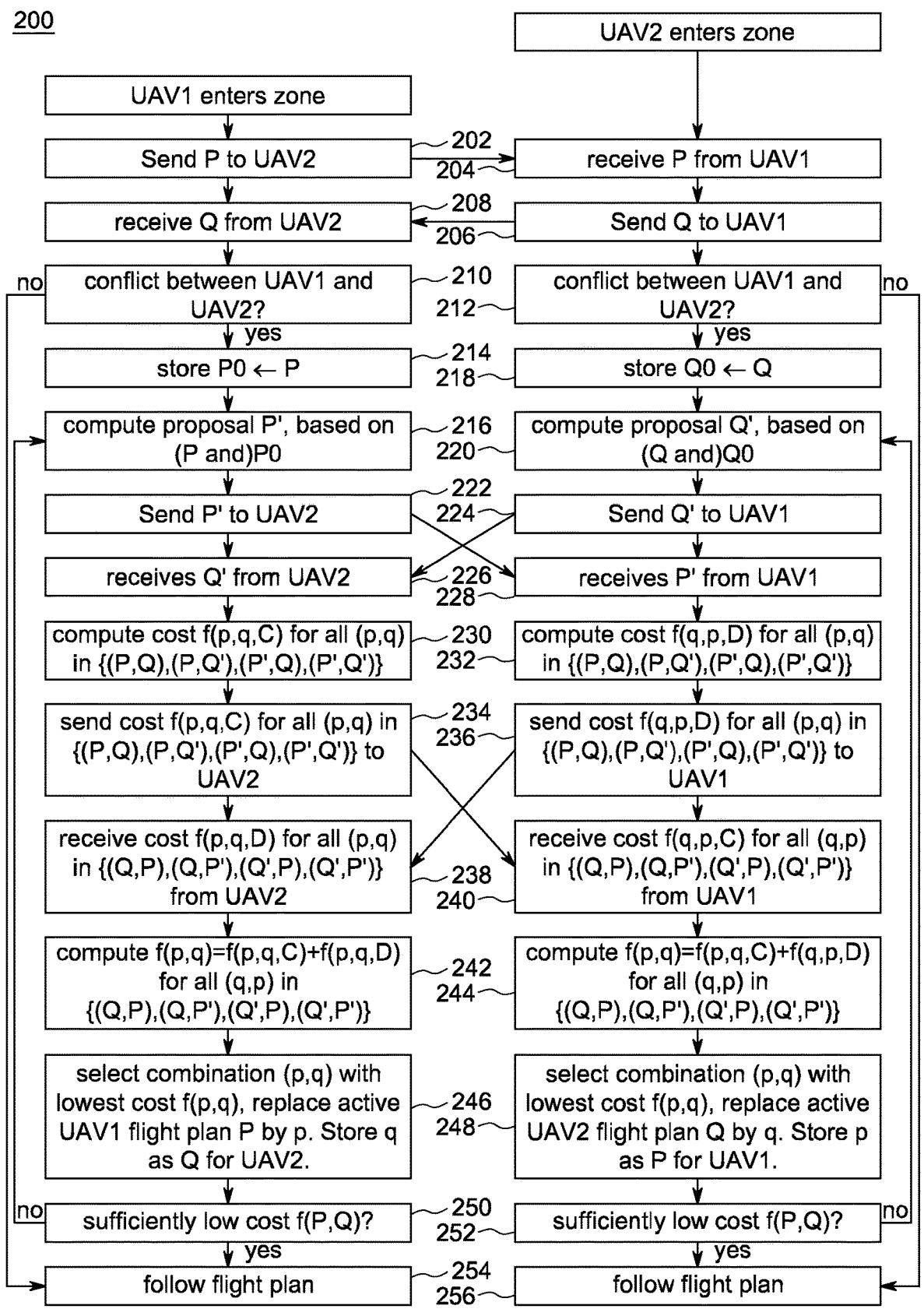
FIG. 2 illustrates a flowchart of an example for a decentralized negotiation of flight-plans.

While some basics of the proposed technique for conflict resolution between two UVs are described above with reference to method 100, a more detailed example of a method 200 for resolving a conflict between a first UV and a second UV is described in the following with reference to FIG. 2. In the example of FIG. 2, it is assumed that the first UV and the second UV are UAVs. However, the method 200 may analogously be used for other vehicles autonomously following individual movement plans such UGVs or USVs.

In the example of FIG. 2, it is assumed that any UAV entering a specific zone (area, region) is able to communicate with other UAVs in the regions, possibly via a relay. Further, each UAV is able to follow a flight plan, which might change during the flight. Additionally, it is assumed that each UAV has a valid flight plan at any time. Similar to what is described above in general as a "movement plan" for UVs, the flight plan of a UAV describes a respective temporal-spatial region which is exclusively reserved for a respective UAV while it navigates (moves) in the region. The region is a predefined geographical region. For example, the flight-plan may comprise a 3D position over time (i.e. a trajectory) and optionally the shape and size of a reserved surrounding space for the respective UAV. The surrounding space may, e.g., cover the UAV extent and optionally a cargo extent and further optional safety margins in order to compensate external influences (e.g. wind), navigation uncertainties of the UAV and/or sensor uncertainties of the UAV (e.g. position sensor uncertainties).

Similar to what is described above for method 100, the individual steps of method 200 are performed autonomously by the first UAV and the second UAV in-flight.

After both UAVs entered the zone, they establish a communication channel for data exchange (e.g. via a wireless communication technique such as a wireless local area network, a cellular network, or Bluetooth).

After establishing the communication channel, the first UAV sends its current flight plan P to the second UAV in a step 202. The second UAV receives the current flight plan P of the first UAV in a step 204 and transmits its current flight plan Q to the first UAV in a step 206. The first UAV receives the current flight plan Q of the second UAV in a step 208.

Based on the current flight plan P of the first UAV and the received current flight plan Q of the second UAV, the first UAV determines whether a conflict with the second UAV is likely to occur in a step 210. In parallel, the second UAV determines whether a conflict with the first UAV is likely to occur in a step 212 based on the current flight plan Q of the second UAV and the received current flight plan P of the first UAV.

If the first UAV determines that a conflict with the second UAV is not likely to occur, it continues to control its flight (movement) based on its initial current flight plan P in a step 254. Similarly, if the second UAV determines that a conflict with the first UAV is not likely to occur, it continues to control its flight (movement) based on its initial current flight plan P in a step 256. In other words, the first UAV and the second UAV continue their flights based on their original flight plans.

If the first UAV determines that a conflict with the second UAV is likely to occur, it stores its initial current flight plan P as a flight plan P0 in step 214 and determines (computes, calculates) at least one candidate flight plan P' of the first UAV in step 216. For example, the first UAV may determine the candidate flight plan P' based on its current flight plan P.

Similarly, if the second UAV determines that a conflict with the first UAV is likely to occur, it stores its initial current flight plan Q as a flight plan Q0 in step 218 and determines (computes, calculates) at least one candidate flight plan Q' of the second UAV in step 220. For example, the second UAV may determine the candidate flight plan Q' based on its current flight plan Q.

In other words, one or more new proposal flight plans with potential to decrease total costs are determined in the steps 216 and 220.

Subsequently, the candidate flight plans P' and Q' are exchanged between the first UAV and the second UAV in steps 222 to 228. In step 222, the first UAV transmits its candidate flight plan P' to the second UAV. Similarly, the second UAV transmits its candidate flight plan Q' to the first UAV in step 224. The first UAV receives the candidate flight plan Q' of the second UAV in step 226, and the second UAV receives the candidate flight plan P' of the first UAV in step 228.

In step 230, the first UAV determines first cost values for different combinations of one of the current flight plan P and the candidate flight plan P' of the first UAV with one of the current flight plan Q and the candidate flight plan Q' of the second UAV using a first cost function f (p, q, C). The argument p of the first cost function denotes one of the current flight plan P and the candidate flight plan P' of the first UAV. The argument q of the first cost function denotes one of the current flight plan Q and the candidate flight plan Q' of the second UAV. The first cost function takes into account properties C of the first UAV such that the first cost values indicate the costs for the different combinations of the flight plans from the first UAV's point of view. For example, the first cost values may be determined for all possible combinations of one of the current flight plan P and the candidate flight plan P' of the first UAV with one of the current flight plan Q and the candidate flight plan Q' of the second UAV.

In step 232, the second UAV analogously determines second cost values for different combinations of one of the current flight plan P and the candidate flight plan P' of the first UAV with one of the current flight plan Q and the candidate flight plan Q' of the second UAV using a second cost function f (p, q, D). Compared to the first cost function f (p, q, C), the second cost function f (p, q, D) takes into account properties D of the second UAV instead of the properties C of the first UAV such that the second cost values indicate the costs for the different combinations of the flight plans from the second UAV's point of view.

The properties C and D of the UAVs may, e.g., comprise one or more of a remaining energy available at the respective UAV, a weight of the respective UAV and/or a cargo transported by the respective UAV, a destination of the respective UAV, capabilities of the respective UAV, and a current configuration of the respective UAV. In some examples, less, more or different properties may be taken into account.

The cost functions f (p, q, C) and f (p, q, D) predict the costs for the respective UAV when following a specific flight plan p, q while taking into account the specific flight plan q, p of the other UAV. More precisely, the cost functions f (p, q, C) and f (p, q, D) provide the predicted costs from the point of view of the respective UAV. Any UAV in the zone should be able to evaluate such a cost function for fair conflict resolution.

For example, the first cost function f (p, q, C) comprises at least one of the following: at least one term for costs related to an energy consumption of the first UAV; at least one term for costs related to a late arrival of the first UAV at a destination; at least one term for costs related to a risk of loss of the first UAV; at least one term for costs related to a risk of loss of a cargo transported by the first UAV; and at least one term related to a priority of a trip of the first UAV. In some examples, less, more or different term may be used.

In some examples, the first cost function f (p, q, C) may be defined as follows:

$$f(p,q,C)=b*(u1+u2+u3+u4) \quad (1)$$

with b denoting a term related to a priority of a trip of the first UAV, u1 denoting a term for costs related to an energy consumption of the first UAV, u2 denoting a term for costs related to a late arrival of the first UAV at a destination indicated in the initial current flight plan, u3 denoting a term for costs related to a risk of loss of the first UAV and u4 denoting a term for costs related to a risk of loss of a cargo transported by the first UAV.

The first cost function f (p, q, C) according to mathematical expression (1) may allow to take into account that the costs for energy increase on detours, that the costs for late arrival increase on detours or intermediate landing for recharging. Similarly, the loss of the first UAV and/or its cargo may be taken into account. For example, the terms for costs related to a risk of loss of the first UAV and the cargo transported by the first UAV may indicate zero costs if the first UAV and the cargo arrive safely at the destination for the specific combination of flight plans p, q. On the other hand, the terms for costs related to a risk of loss of the first UAV and the cargo transported by the first UAV may indicate very high costs if the first UAV and the cargo are lost for the specific combination of flight plans p, q due to a crash of the first UAV and the second UAV. Similarly, the terms for costs related to a risk of loss of the first UAV and the cargo transported by the first UAV may indicate very high costs if a loss of the first UAV and the cargo is likely for the specific combination of flight plans p, q for other reasons than a collision (e.g. because the first UAV will run out of energy). The terms for costs related to a risk of loss of the first UAV and the cargo transported by the first UAV may, e.g., indicate high costs if the specific combination of flight plans p, q leads to a risky situation (e.g. close passage of the first UAV and the second UAV). The term related to the priority of the trip of the first UAV may allow to take into account the importance of the trip of the first UAV. For example, the term related to the priority of the trip of the first UAV may be one for a "normal trip" and be high for urgent trips or emergency trips.

The second cost function f (p, q, D) may comprise equivalent or similar terms for the second UAV. In general, the arguments p, q, C and D should be trustable.

Subsequently, the first cost values and the second cost values are exchanged between the first UAV and the second UAV in steps 234 to 240. In step 234, the first UAV transmits the first cost values to the second UAV. Similarly, the second UAV transmits the second cost values to the first UAV in step 236. The first UAV receives the second cost values of the second UAV in step 238, and the second UAV receives the first cost values of the first UAV in step 240.

The first UAV combines the determined first cost values and the received second cost values in step 242 in order to determine third cost values for the different combinations. By combining the first cost values and the second cost values to the third cost values, the total costs for both UAVs may be determined. For example, the first cost values and the second cost values may be added as follows:

$$f(p,q)=f(p,q,C)+f(p,q,D) \qquad (2)$$

The second UAV combines the determined second cost values and the received first cost values analogously to third cost values in step 244.

Subsequently, the first UAV determines in step 246 the combination of flight plans (p, q) exhibiting the best third cost value among the different combinations (e.g. the cost value indicating the lowest costs). Further, the first UAV updates its current flight plan P to the flight plan p of the first UAV that is included in the combination (p, q) exhibiting the best third cost value among the different combinations. For example, if the current flight plan P of the first UAV is included in the combination exhibiting the best third cost value among the different combinations, the current flight plan P of the first UAV remains as it is. On the other hand, if the candidate flight plan P' of the first UAV is included in the combination exhibiting the best third cost value among the different combinations, the current flight plan P of the first UAV is updated to the candidate flight plan P'. Further, the flight plan q of the second UAV that is included in the combination (p, q) exhibiting the best third cost value among the different combinations is stored as the new flight plan of the second UAV by the first UAV.

The first UAV then checks whether the total costs for the selected combination (p, q) are sufficiently low. Therefore, in step 250, the first UAV determines whether the third cost value of the combination (p, q) exhibiting the best third cost value in this iteration satisfies a predetermined quality criterion. For example, it may be determined if the costs indicated by the third cost value of the combination (p, q) exhibiting the best third cost value in this iteration are below a predetermined threshold value. If the third cost value of the combination exhibiting the best third cost value in this iteration does not satisfy the predetermined quality criterion, i.e. if the total costs for the selected combination (p, q) are too high, the first UAV performs another iteration of the steps beginning with step 216. If the third cost value of the combination exhibiting the best third cost value in this iteration does satisfy the first predetermined quality criterion, the first UAV controls its flight (movement) based on the updated current flight plan P determined in this iteration of step 246.

Similarly, the second UAV determines in step 252 whether the third cost value of the combination (p, q) exhibiting the best third cost value in this iteration satisfies the predetermined quality criterion. If the third cost value of the combination exhibiting the best third cost value in this iteration does not satisfy the predetermined quality criterion, i.e. if the total costs for the selected combination (p, q) are too high, the second UAV performs another iteration of the steps beginning with step 220. If the third cost value of the combination exhibiting the best third cost value in this iteration does satisfy the first predetermined quality criterion, the second UAV control its flight (movement) based on the updated current flight plan Q determined in this iteration of step 248.

As can be seen from FIG. 2, each of the first and the second UAV implements a negotiation method which communicates with the other UAV and cooperatively adapts its flight plan P, Q such that the updated flight plans P, Q reduce the total costs and avoid conflicts.

In the following some more details about how the candidate flight plan P' and Q' may be obtained in steps 216 and 220 are given.

The step 216 of determining the candidate flight plan P' of the first UAV may, e.g., comprise generating a proposal P''' for the candidate flight plan of the first UAV based on the current flight plan P of the first UAV. Similarly, the step 220 of determining the candidate flight plan Q' of the second UAV may, e.g., comprise generating a proposal Q'' for the candidate flight plan of the second UAV based on the current flight plan Q of the second UAV.

For example, if the current flight plans P and Q of the UAVs indicate a collision, the step 216 of generating the proposal P''' for the candidate flight plan of the first UAV may comprise determining a collision point of the first UAV and the second UAV based on the current flight plan P of the first UAV and the current flight plan Q of the second UAV, and generating the proposal P''' for the candidate flight plan of the first UAV such that the first UAV stops before reaching the collision point. Generating the proposal Q'' for the candidate flight plan of the second UAV may be equivalent, i.e. the proposal Q'' for the candidate flight plan of the second UAV may be such that the second UAV stops before reaching the collision point previously determined by the second UAV based on the current flight plan P of the first UAV and the current flight plan Q of the second UAV.

Alternatively, generating the proposal P''' for the candidate flight plan of the first UAV may comprise varying one or more parameters of the current flight plan P of the first UAV. For example, the one or more parameters of the current flight plan P of the first UAV may comprise an altitude of the first UAV, a speed of the first UAV and/or a movement trajectory of the first UAV. In other examples, less, more or different parameters of the current flight plan P of the first UAV may be varied. For example, a speed of the first UAV may be increased or decreased before reaching a potential conflict (e.g. collision) point such that the first UAV arrives earlier or later at the potential conflict point in order to avoid the conflict with the second UAV. Alternatively or additionally, an altitude (height) of the first UAV may be increased or decreased before reaching a potential conflict (e.g. collision) point such that the first UAV arrives at a higher or lower altitude at the potential conflict point in order to avoid the conflict with the second UAV. Further, alternatively or additionally, a course of the first UAV may be changed before reaching a potential conflict (e.g. collision) point such that a minimum distance between the first UAV and the second UAV is increased at the potential conflict point in order to avoid the conflict with the second UAV.

Similarly, generating the proposal Q'' for the candidate flight plan of the second UAV may comprise varying one or more parameters of the current flight plan Q of the second UAV.

In case the step 216 is performed in an iteration i>1, generating the proposal P''' for the candidate flight plan of the first UAV may further be based on one or more flight plans of the first UAV used in previous iterations of step 216 for updating the current flight plan P of the first UAV. For example, the initial current flight plan P0 and the flight plan of the first UAV used in the last iteration i−1 of step 216 for updating the current flight plan P of the first UAV may be used to generate the proposal P''' for the candidate flight plan in the iteration i. Similarly, generating the proposal Q''' for the candidate flight plan of the second UAV may further be based on one or more flight plans of the second UAV used in previous iterations of step 220 for updating the current flight plan Q of the second UAV.

The first UAV may further determine a fourth cost value using the first cost function for its proposal P''' for the candidate flight plan and the current flight plan Q of the second UAV. In other words, f (P''', Q, C) is calculated and stored.

Additionally, the first UAV may estimate a fifth cost value using the second cost function its proposal P''' for the candidate flight plan and the current flight plan Q of the second UAV. In other words, f (P''', Q, D) is estimated and stored. For the estimation (approximation) of the fifth cost values, the properties D of the second UAV may, e.g., be received from the second UAV such that the estimate may be precise. In other examples, it may be assumed that the properties of the second UAV are constant to previous iterations. Further, results from previous iterations may be reused (e.g. the second cost value for the combination of the current flight plan P of the first UAV and the current flight plan Q of the second UAV received in a previous iteration may be assumed as the fifth cost value for the combination of the proposal P''' for the candidate flight plan of the first UAV and the current flight plan Q of the second UAV, i.e. f (P''', Q, D)=f (P, Q, D)).

The fourth and fifth cost values estimate the costs for the proposal P''' for the candidate flight plan and the current flight plan Q of the second UAV from the points of view of the first UAV and the second UAV.

Similar to what is described above for the third cost values, the first UAV may further determine a sixth cost value based on the fourth cost value and the fifth cost value in order to estimate the total costs for the proposal P''' for the candidate flight plan. For example, the fourth cost value and the fifth cost value may be added and optionally be weighted before addition. For example, the fourth cost value and the fifth cost value may be added as follows:

$$f(P''',Q)=f(P''',Q,C)+f(P''',Q,D) \quad (3)$$

If the sixth cost value satisfies a second predetermined quality criterion, the first UAV uses the proposal P''' for the candidate flight plan of the first UAV as the candidate flight plan of the first UAV. If the sixth cost value does not satisfy the second predetermined quality criterion, the first UAV generates another proposal for the candidate flight plan of the first UAV. In other words, the proposal P''' is accepted as the candidate flight plan of the first UAV if it satisfies the second predetermined quality criterion. For example, the second predetermined quality criterion may be that the sixth cost value is smaller than the third cost value for the current flight plan of the first UAV and the current flight plan P of the second UAV (i.e. f (P''', Q)<f (P, Q)). Accordingly, it may be ensured that the proposal P''' for the candidate flight plan of the first UAV causes fewer total costs than the current flight plan P of the second UAV.

The second UAV may perform an equivalent processing for assessing (evaluating) the proposal Q''' for the candidate flight plan of the second UAV.

Figure 3:
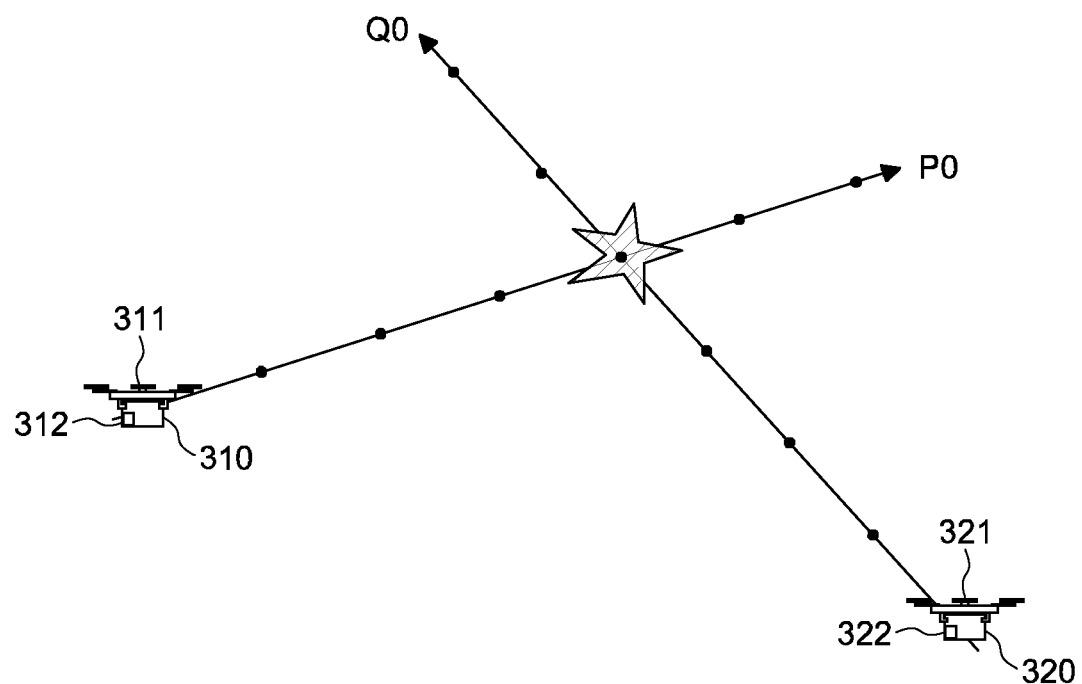
FIGS. 3 to 9 illustrate exemplary flight situations.

In the following, an exemplary conflict resolution between two UAVs 310 and 320 according to the proposed technique is described with reference to FIGS. 3 to 9. FIG. 3 illustrates the initial situation. Each of the UAVs 310 and 320 comprises a propulsion system 311, 321 (e.g. motor driven rotors) and circuitry 312, 322 configured to perform the proposed method for avoiding a conflict with another UAV. The circuitry 312, 322 may, e.g., comprise respective data processing circuitry and respective wireless communication circuitry. For example, the processing circuit may be a single dedicated processor, a single shared processor, or a plurality of individual processors, some of which or all of which may be shared, a digital signal processor (DSP) hardware, an application specific integrated circuit (ASIC) or a field programmable gate array (FPGA). The processing circuit may optionally be coupled to, e.g., read only memory (ROM) for storing software, random access memory (RAM) and/or non-volatile memory.

The first UAV 310 follows the current flight plan P=P0 and the second UAV 320 follows the current flight plan Q=Q0. The UAVs 310 and 320 determine that a conflict is likely to occur. In particular, the UAVs 310 and 320 determine that a collision is likely when following the flight plans P0 and Q0. The costs f (P0, Q0) for following the current flight plans P0 and Q0 are very high due to the crash and the resulting loss of cargos and UAVs.

Figure 4:
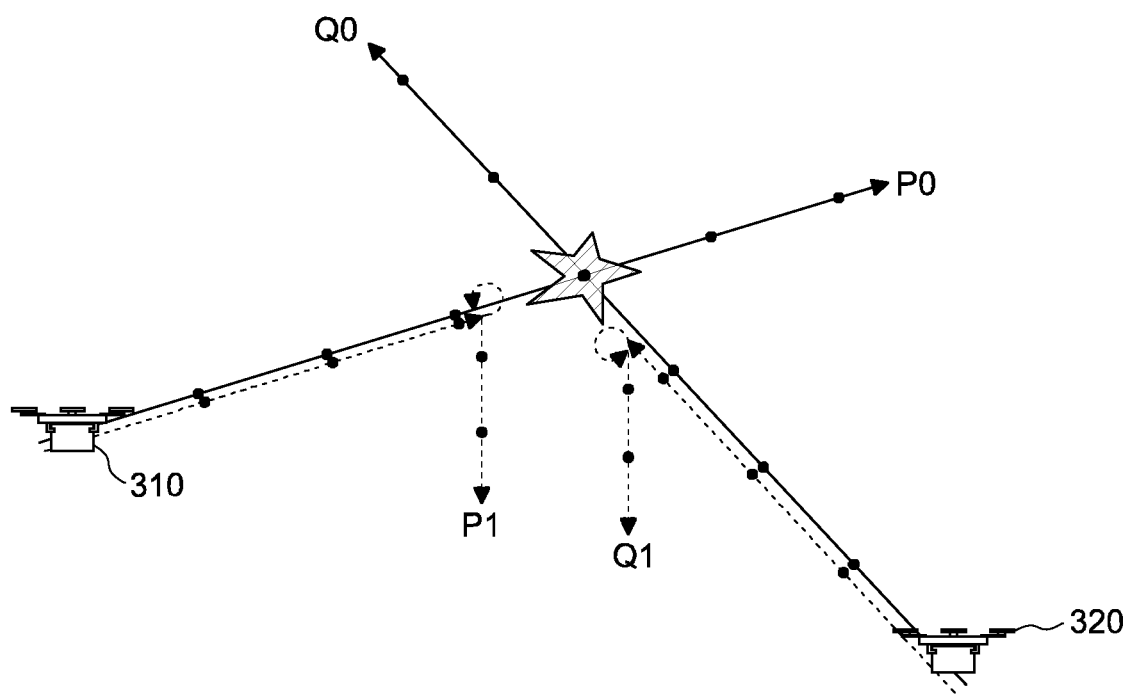

The UAVs 310 and 320 determine first candidate flight plans P1 and Q1 in order to avoid the crash. The first candidate flight plans P1 and Q1 are illustrated in FIG. 4 together with the current flight plans P0 and Q0. According to the first candidate flight plan P1, the first UAV 310 holds position and then lands to a safe landing place before reaching the collision point. Accordingly, the first UAV 310 may avoid the crash, but cannot reach its destination. Similarly, the second UAV 320 holds position and then lands to a safe landing place before reaching the collision point according to the first candidate flight plan Q1. Therefore, also the second UAV 320 may avoid the crash, but cannot reach its destination.

Figure 5:
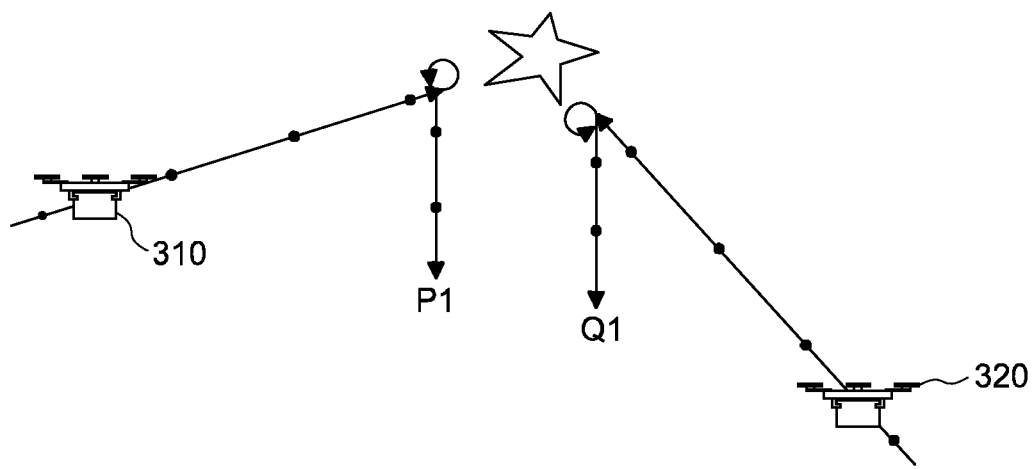

The third cost value (i.e. the total costs) for the flight plans P1 and Q1 is high, but still lower than for the initial flight plans P0 and Q0. Therefore, the first UAV 310 and the second UAV 320 (temporarily) agree on P1 and Q1 to be the new active flight plans P=P1 and Q=Q1. As illustrated in FIG. 5, the first UAV 310 and the second UAV 320 follow the agreed flight plans P1 and Q1. In some examples, f (P0, Q1) and f (P1, Q0) may be not considered in the first iteration as a precaution to avoid a conflict quickly.

Due to the high total costs for the flight plans P1 and Q1, a new iteration for determining candidate flight plans is started. In other words, the first UAV 310 and the second UAV 320 continue refining the flight plans.

Figure 6:
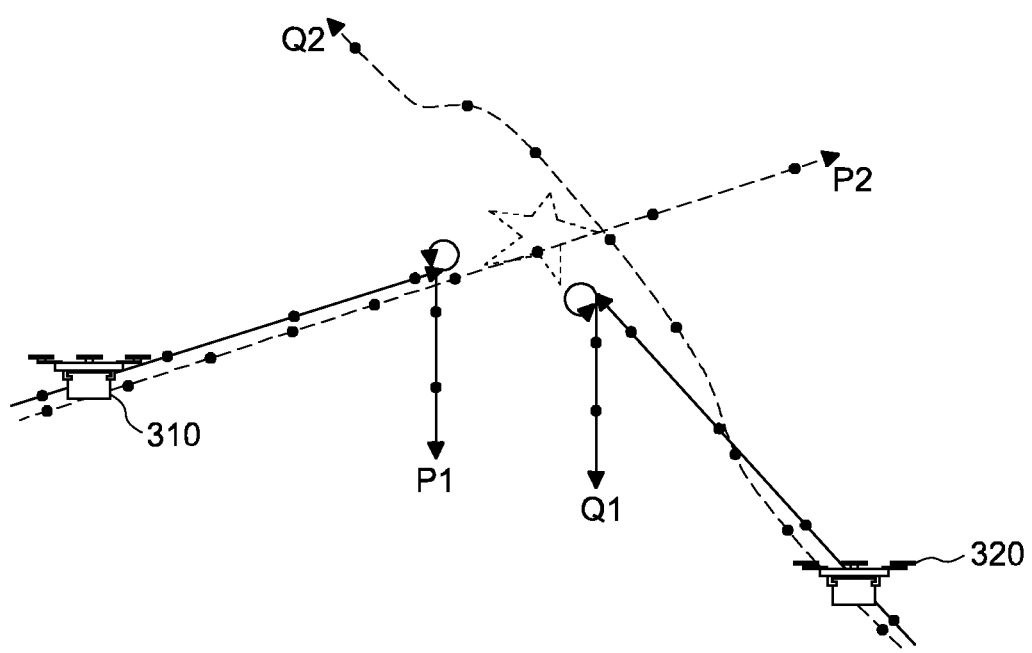

FIG. 6 illustrates the flight plan generation in the second iteration while the UAVs 310 and 320 follow the flight plans P1 and Q1. The first UAV 310 creates a second candidate flight plan P2 based on the previous flight plans P0 and P1, whereas the second UAV 320 creates a second candidate flight plan Q2 based on the previous flight plans Q0 and Q1. The second candidate flight plan Q2 causes the second UAV 320 to temporarily fly at a higher flight level (altitude) near the collision point. The second candidate flight plan P2 of the first UAV 310 substantially corresponds to the original flight plan P0 of the first UAV 310. The only difference to the original flight plan P0 is that the second candidate flight plan P2 causes the first UAV 310 to reduce speed before reaching the collision point. As can be seen from FIG. 6, there would be no conflict for the second candidate flight plans P2 and Q2. The first UAV 310 and the second UAV 320 would reach their respective destination for the combination of the flight plans P2 and Q2. The first UAV 310 as well as the second UAV 320 would both arrive a bit late at their respective destination and require a bit more of energy due to the longer travel time and the increased height.

Figure 7:
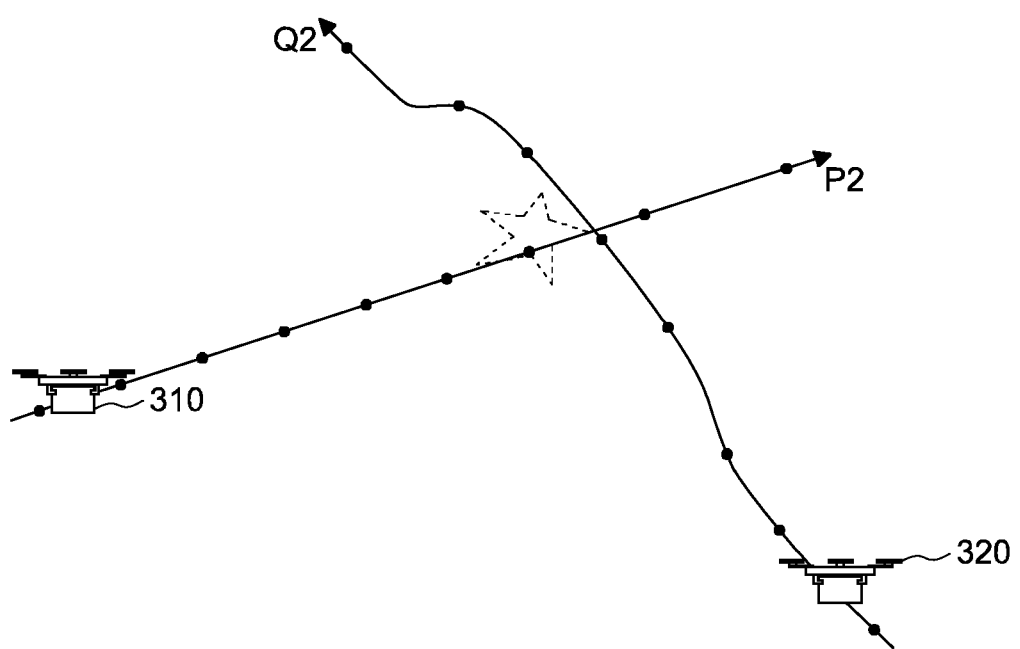

The total costs f (P2, Q2) for the combination of the flight plans P2 and Q2 are the lowest. Therefore, as illustrated in FIG. 7, P=P2 and Q=Q2 are defined as the new active flight plans such that the first UAV 310 follows the flight plan P=P2 and the second UAV 320 follows the flight plan Q=Q2. As the total costs for the combination of the flight plans P2 and Q2 are not yet sufficiently low, a further iteration for updating the current flight plans is required.

Figure 8:
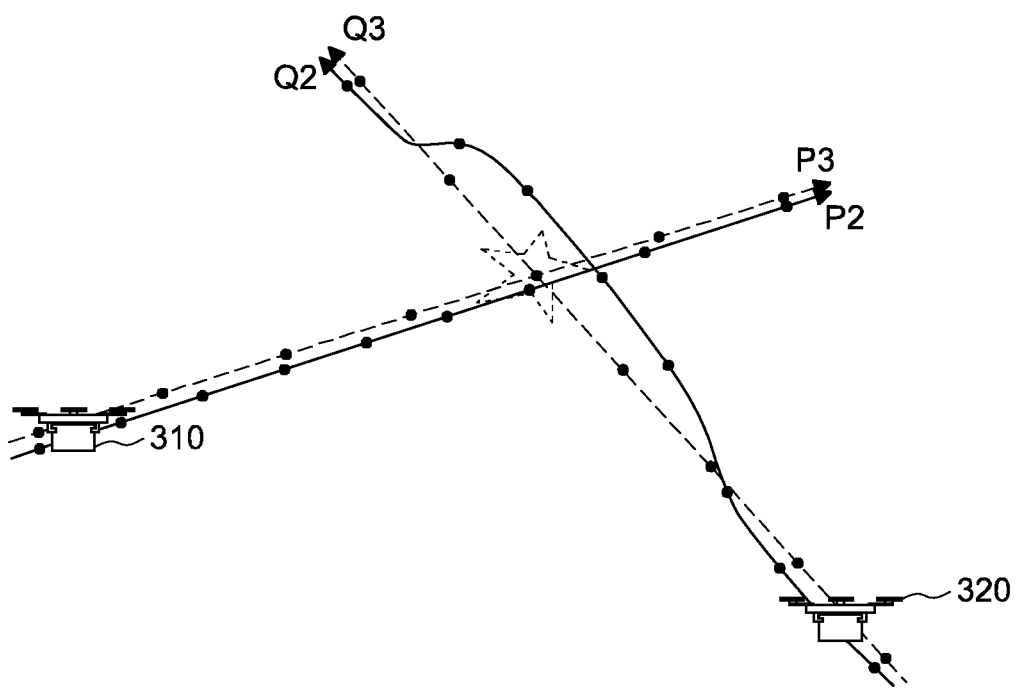

FIG. 8 illustrates the flight plan generation in the third iteration while the UAVs 310 and 320 follow the flight plans P2 and Q2. The first UAV 310 creates a third candidate flight plan P3 based on the previous flight plans P0, P1 and P2, whereas the second UAV 320 creates a third candidate flight plan Q3 based on the previous flight plans Q0, Q1 and Q2. The third candidate flight plan Q3 is identical to the original flight plan Q0. The third candidate flight plan P3 of the first UAV 310 substantially corresponds to the current flight plan P2 of the first UAV 310. In other words, the third candidate flight plan P3 causes the first UAV 310 to reduce speed before reaching the collision point. As can be seen from FIG. 6, there would be no conflict for the third candidate flight plans P3 and Q3 as the first UAV 310 would reduce speed before reaching the collision point such that the second UAV 320 can pass the collision point before the first UAV 310 reaches the collision point.

Figure 9:
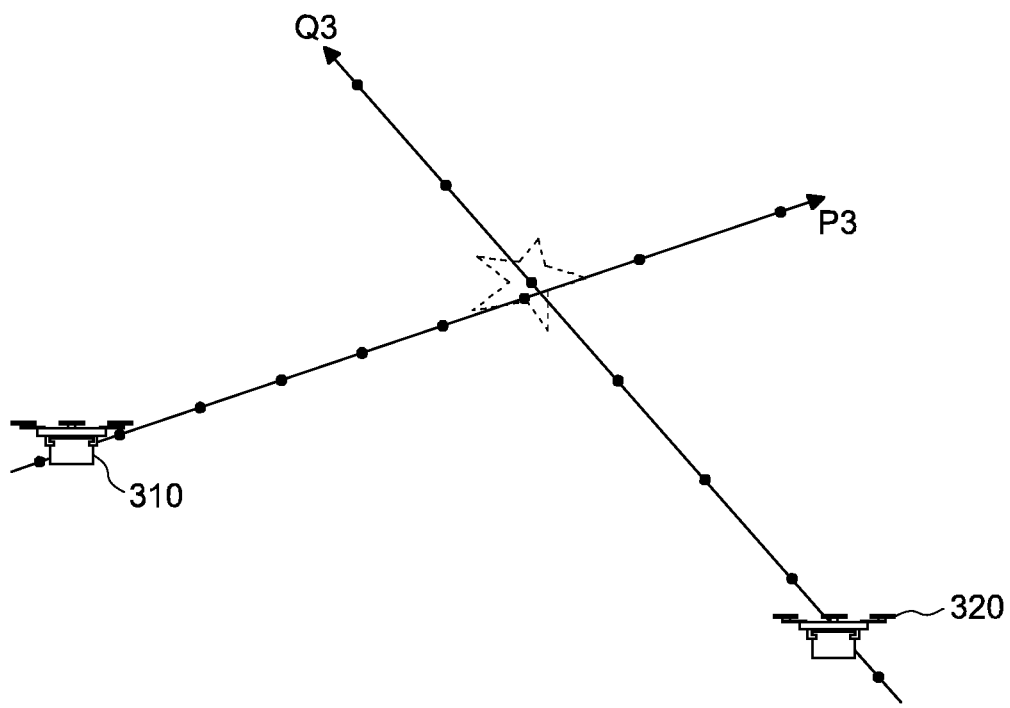

The first UAV 310 and the second UAV 320 would reach their respective destination for the combination of the flight plans P3 and Q3. Only the first UAV 310 would arrive a bit late at its destination. The total costs f (P3, Q3) for the combination of the flight plans P3 and Q3 are the lowest. Therefore, as illustrated in FIG. 9, P=P3 and Q=Q3=Q0 are defined as the new active flight plans such that the first UAV 310 follows the flight plan P=P3 and the second UAV 320 follows the flight plan Q=Q3=Q0. As the total costs for the combination of the flight plans P3 and Q3 are sufficiently low, no further iterations for updating the current flight plans are required. The conflict is resolved. The new flight plans P3 and Q3 generate only small additional costs compared to the original conflicting flight plans P0 and Q0.

The cost functions f (p, q, C) and f (p, q, D) may rate flight plans which lead to a loss of a UAV with very high costs. By reducing the costs, flight plans, which lead to conflicts and collisions, may be avoided. The cost functions may be defined to penalize all critical situation with the other UAV in the future. Thus, conflicts may be detected early and be resolved timely. The cost function may allow to model disadvantages of a particular flight plan in a very descriptive way. The example above includes priorities, energy consumption and costs for late arrival. The proposed negotiation method is designed to iteratively reduce the total costs. Flight plans, which increase the costs, are rejected. The negotiation is performed by the two involved UAVs and does not require a central station. Thus, it is decentralized.

As described above, the technology described above in connection with FIGS. 2 to 9 is not limited to UAVs following flight plans. The technology may analogously be used for other vehicles autonomously following respective movement plans such UGVs or USVs.

The following examples pertain to further embodiments:
(1) A method for a first UV for avoiding a conflict with a second UV, the method comprising:
  determining, based on a current movement plan of the first UV and a current movement plan of the second UV received from the second UV, whether a conflict with the second UV is likely to occur; and
  if it is determined that a conflict with the second UV is likely to occur, performing at least one iteration of the following steps:
  a) determining a candidate movement plan of the first UV and receiving, from the second UV, a candidate movement plan of the second UV;
  b) determining first cost values for different combinations of one of the current movement plan and the candidate movement plan of the first UV with one of the current movement plan and the candidate movement plan of the second UV using a first cost function;
  c) receiving, from the second UV, second cost values for the different combinations, wherein the second cost values are calculated by the second UV using a second cost function;
  d) combining the first cost values and the second cost values in order to determine third cost values for the different combinations; and
  e) updating the current movement plan of the first UV to the movement plan of the first UV that is included in the combination exhibiting the best third cost value among the different combinations.
(2) The method of (1), wherein the method further comprises:
  determining whether the third cost value of the combination exhibiting the best third cost value in the recent iteration satisfies a predetermined quality criterion; and
  if the third cost value of the combination exhibiting the best third cost value in the recent iteration does not satisfy the predetermined quality criterion, performing another iteration of steps a) to e).
(3) The method of (1) or (2), wherein the method further comprises:
  determining whether the third cost value of the combination exhibiting the best third cost value in the recent iteration satisfies a first predetermined quality criterion; and
  if the third cost value of the combination exhibiting the best third cost value in the recent iteration does satisfy the first predetermined quality criterion, controlling movement of the first UV based on the updated current movement plan determined in the recent iteration.
(4) The method of any of (1) to (3), wherein determining a candidate movement plan of the first UV comprises:
  generating a proposal for the candidate movement plan of the first UV based on the current movement plan of the first UV;
  determining a fourth cost value using the first cost function for the proposal for the candidate movement plan of the first UV and the current movement plan of the second UV;
  estimating a fifth cost value using the second cost function for the proposal for the candidate movement plan of the first UV and the current movement plan of the second UV;
  determining a sixth cost value based on the fourth cost value and the fifth cost value; and
  using the proposal for the candidate movement plan of the first UV as the candidate movement plan of the first UV if the sixth cost value satisfies a second predetermined quality criterion.
(5) The method of (4), wherein determining a candidate movement plan of the first UV further comprises:

generating another proposal for the candidate movement plan of the first UV if the sixth cost value does not satisfy the second predetermined quality criterion.

(6) The method of (4) or (5), wherein generating the proposal for the candidate movement plan of the first UV is further based on one or more movement plans of the first UV used in previous iterations of step e) for updating the current movement plan of the first UV.

(7) The method of any of (4) to (6), wherein generating the proposal for the candidate movement plan of the first UV comprises varying one or more parameters of the current movement plan of the first UV.

(8) The method of (7), wherein the one or more parameters of the current movement plan of the first UV comprise at least one of: an altitude of the first UV, a speed of the UV, a movement trajectory of the first UV.

(9) The method of any of (4) to (6), wherein generating the proposal for the candidate movement plan of the first UV comprises:
determining a collision point of the first UV and the second UV based on the current movement plan of the first UV and the current movement plan of the second UV;
generating the proposal for the candidate movement plan of the first UV such that the first UV stops before reaching the collision point.

(10) The method of any of (1) to (9), wherein the first cost function comprises at least one of the following:
at least one term for costs related to an energy consumption of the first UV;
at least one term for costs related to a late arrival of the first UV at a destination;
at least one term for costs related to a risk of loss of the first UV;
at least one term for costs related to a risk of loss of a cargo transported by the first UV; and
at least one term related to a priority of a trip of the first UV.

(11) The method of any of (1) to (10), wherein the first cost function takes into account properties of the first UV.

(12) The method of (11), wherein the properties of the first UV comprise at least one of the following: remaining energy available at the first UV, a weight of the first UV and/or a cargo transported by the first UV, a destination of the first UV, capabilities of the first UV, and a current configuration of the first UV.

(13) The method of any of (1) to (10), wherein the second cost function takes into account properties of the second UV.

(14) The method of any of (1) to (13), further comprising one or more of:
transmitting the current movement plan of the first UV to the second UV;
transmitting the candidate movement plan of the first UV to the second UV; and
transmitting the first cost values for the different combinations to the second UV.

(15) The method of any of (1) to (14), further comprising:
if it is determined that a conflict with the second UV is not likely to occur, continuing to control movement of the first UV based on the initial current movement plan of the first UV.

(16) The method of any of (1) to (15), wherein the first UV and the second UV are UAVs.

(17) The method of any of (1) to (16), wherein the current movement plant of the first UV comprises information about a temporal course of a spatial region reserved for movement of the first UV, and/or wherein the current movement plant of the second UV comprises information about a temporal course of a spatial region reserved for movement of the second UV.

(18) A non-transitory machine-readable medium having stored thereon a program having a program code for performing the method according to any of (1) to (17), when the program is executed on a processor or a programmable hardware.

(19) A program having a program code for performing the method according to any of (1) to (17), when the program is executed on a processor or a programmable hardware.

(20) An UV capable of avoiding a conflict with another UV, the UV comprising a propulsion system and circuitry configured to:
determine, based on a current movement plan of the UV and a current movement plan of the other UV received from the other UV, whether a conflict with the other UV is likely to occur; and
if it is determined that a conflict with the other UV is likely to occur, perform at least one iteration of the following steps:
a) determine a candidate movement plan of the UV and receive, from the other UV, a candidate movement plan of the other UV;
b) determine first cost values for different combinations of one of the current movement plan and the candidate movement plan of the UV with one of the current movement plan and the candidate movement plan of the other UV using a first cost function;
c) receive, from the other UV, second cost values for the different combinations, wherein the second cost values are calculated by the other UV using a second cost function;
d) combine the first cost values and the second cost values in order to determine third cost values for the different combinations; and
e) update the current movement plan of the UV to the movement plan of the UV that is included in the combination exhibiting the best third cost value among the different combinations.

(21) The UV of (20), wherein the UV is an UAV.

The aspects and features mentioned and described together with one or more of the previously detailed examples and figures, may as well be combined with one or more of the other examples in order to replace a like feature of the other example or in order to additionally introduce the feature to the other example.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in a non-transitory machine readable medium (e.g. a floppy disc, a DVD, a Blu-Ray, a CD, a ROM, a PROM, and EPROM, an EEPROM or a FLASH memory) and so executed by a processor or a programmable hardware, whether or not such processor or a programmable hardware is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for updating a current movement plan of a first Unmanned Vehicle, UV, that is controlled by the current movement plan for avoiding a conflict with a second UV, the method performed by the first UV comprising:
   performing at least one iteration of the following:
   a) determining a candidate movement plan of the first UV and receiving, from the second UV, a candidate movement plan of the second UV;
   b) determining first cost values for different combinations of one of the current movement plan and the candidate movement plan of the first UV with one of the current movement plan and the candidate movement plan of the second UV using a first cost function taking into account properties of the first UV, wherein
   properties of the first UV includes at least one of the following
      remaining energy available at the first UV,
      a weight of the first UV and/or a cargo transported by the first UV,
      a destination of the first UV, capabilities of the first UV, and
      a current configuration of the first UV, and
   the first cost function includes at least one of the following
      at least one term for costs related to an energy consumption of the first UV;
      at least one term for costs related to a late arrival of the first UV at a destination;
      at least one term for costs related to a risk of loss of the first UV;
      at least one term for costs related to a risk of loss of a cargo transported by the first UV; and
      at least one term related to a priority of a trip of the first UV;
   c) receiving, from the second UV, second cost values for the different combinations, wherein the second cost values are calculated by the second UV using a second cost function taking into account properties of the second UV;
   d) combining the first cost values and the second cost values in order to determine third cost values for the different combinations;
   e) updating the current movement plan of the first UV to the movement plan of the first UV that is included in the combination exhibiting a lowest third cost value among the third cost values; and
   f) determining whether the lowest third cost value is less than a first predetermined threshold value,
   in response to the lowest third cost value being less than the first predetermined threshold value, storing the updated movement plan in the non-transitory machine readable medium and controlling movement of the first UV based on the updated movement plan, and
   in response to the lowest third cost value not being less than the first predetermined threshold value, following the current movement plan and performing another iteration of a) to f).

2. The method of claim 1, wherein determining the candidate movement plan of the first UV comprises:
   generating a proposal for the candidate movement plan of the first UV based on the current movement plan of the first UV;
   determining a fourth cost value using the first cost function for the proposal for the candidate movement plan of the first UV and the current movement plan of the second UV;
   estimating a fifth cost value using the second cost function for the proposal for the candidate movement plan of the first UV and the current movement plan of the second UV;
   determining a sixth cost value based on the fourth cost value and the fifth cost value; and
   in response to the sixth cost value being less than a second predetermined threshold value, using the proposal for the candidate movement plan of the first UV as the candidate movement plan of the first UV.

3. The method of claim 2, wherein determining the candidate movement plan of the first UV further comprises:
   in response to the sixth cost value not being less than the second predetermined threshold value, generating another proposal for the candidate movement plan of the first UV.

4. The method of claim 2, wherein generating the proposal for the candidate movement plan of the first UV is further based on one or more movement plans of the first UV used in previous iterations of step e) for updating the current movement plan of the first UV.

5. The method of claim 2, wherein generating the proposal for the candidate movement plan of the first UV comprises varying one or more parameters of the current movement plan of the first UV.

6. The method of claim 5, wherein the one or more parameters of the current movement plan of the first UV comprise at least one of: an altitude of the first UV, a speed of the UV, a movement trajectory of the first UV.

7. The method of claim 2, wherein generating the proposal for the candidate movement plan of the first UV comprises:
   determining a collision point of the first UV and the second UV based on the current movement plan of the first UV and the current movement plan of the second UV; and generating the proposal for the candidate movement plan of the first UV such that the first UV stops before reaching the collision point.

8. The method of claim 1, further comprising one or more of:
- transmitting the current movement plan of the first UV to the second UV;
- transmitting the candidate movement plan of the first UV to the second UV; and
- transmitting the first cost values for the different combinations to the second UV.

9. The method of claim 1, wherein the first UV and the second UV are unmanned aerial vehicles.

10. The method of claim 1, wherein the current movement plan of the first UV comprises information about a temporal course of a spatial region reserved for movement of the first UV, and/or wherein the current movement plan of the second UV comprises information about a temporal course of a spatial region reserved for movement of the second UV.

11. A non-transitory machine-readable medium having stored thereon a program having a program code for performing the method according to claim 1, when the program is executed on a processor or a programmable hardware.

12. An Unmanned Vehicle, UV, capable of avoiding a conflict with another UV, the UV comprising a propulsion system and circuitry configured to:
- determine, based on a current movement plan of the UV and a current movement plan of the other UV received from the other UV stored in a non-transitory machine readable medium, whether a conflict with the other UV is likely to occur;
- in response to a conflict with the other UV being unlikely to occur, follow the current movement plan; and
- in response to a conflict with the other UV being likely to occur, perform at least one iteration of the following:
  a) determine a candidate movement plan of the UV and receive, from the other UV, a candidate movement plan of the other UV;
  b) determine first cost values for different combinations of one of the current movement plan and the candidate movement plan of the UV with one of the current movement plan and the candidate movement plan of the other UV using a first cost function taking into account properties of the UV, wherein
  properties of the first UV includes at least one of the following
  - remaining energy available at the first UV,
  - a weight of the first UV and/or a cargo transported by the first UV,
  - a destination of the first UV, capabilities of the first UV, and
  - a current configuration of the first UV, and
  the first cost function includes at least one of the following
  - at least one term for costs related to an energy consumption of the first UV;
  - at least one term for costs related to a late arrival of the first UV at a destination;
  - at least one term for costs related to a risk of loss of the first UV;
  - at least one term for costs related to a risk of loss of a cargo transported by the first UV; and
  - at least one term related to a priority of a trip of the first UV;
  c) receive, from the other UV, second cost values for the different combinations, wherein the second cost values are calculated by the other UV using a second cost function taking into account properties of the other UV;
  d) combine the first cost values and the second cost values in order to determine third cost values for the different combinations;
  e) update the current movement plan of the UV to the movement plan of the UV that is included in the combination exhibiting a lowest third cost value among the third cost values; and
  f) determine whether the lowest third cost value is less than a first predetermined threshold value,
  in response to the lowest third cost value being less than the first predetermined threshold value, store the updated movement plan in the non-transitory machine readable medium and control movement of the first UV based on the updated movement plan, and
  in response to the lowest third cost value not being less than the first predetermined threshold value, follow the current movement plan and perform another iteration of a) to f).

13. The UV of claim 12, wherein the UV is an unmanned aerial vehicle.

14. The UV of claim 12, wherein to determine the candidate movement plan of the first UV, the circuitry is configured to:
- generate a proposal for the candidate movement plan of the first UV based on the current movement plan of the first UV;
- determine a fourth cost value using the first cost function for the proposal for the candidate movement plan of the UV and the current movement plan of the other UV;
- estimate a fifth cost value using the second cost function for the proposal for the candidate movement plan of the UV and the current movement plan of the other UV;
- determine a sixth cost value based on the fourth cost value and the fifth cost value; and
- in response to the sixth cost value being less than a second predetermined threshold value, use the proposal for the candidate movement plan of the UV as the candidate movement plan of the UV.

15. The UV of claim 14, wherein to determine the candidate movement plan of the UV, the circuitry is configured to:
- in response to the sixth cost value not being less than the second predetermined threshold value, generate another proposal for the candidate movement plan of the UV.

16. The UV of claim 14, wherein the circuitry is configured to:
- generate the proposal for the candidate movement plan of the first UV further based on one or more movement plans of the UV used in previous iterations of e) for updating the current movement plan of the UV.

17. The UV of claim 14, wherein the circuitry is configured to:
- generate the proposal for the candidate movement plan of the UV by varying one or more parameters of the current movement plan of the UV.

18. The UV of claim 14, wherein the circuitry is configured to:
- determine a collision point of the UV and the other UV based on the current movement plan of the UV and the current movement plan of the other UV; and
- generate the proposal for the candidate movement plan of the UV such that the UV stops before reaching the collision point.

* * * * *